(12) United States Patent  
Klarer

(10) Patent No.: US 6,483,201 B1  
(45) Date of Patent: Nov. 19, 2002

(54) MOTORCYCLE SAFETY SWITCH

(76) Inventor: John Klarer, 1127 Gibraltar Point Dr., St. Charles, MO (US) 63304

( * ) Notice: Subject to any disclaimer, the term of this patent is extended or adjusted under 35 U.S.C. 154(b) by 80 days.

(21) Appl. No.: 09/618,156

(22) Filed: Jul. 17, 2000

(51) Int. Cl.$^7$ .............................................. B60R 22/00
(52) U.S. Cl. ..................................... 307/10.6; 307/10.1
(58) Field of Search ................................. 307/9.1, 10.1, 307/10.6, 120, 121, 122; 123/179.2, 179.3, 198 DC; 180/170, 21, 218, 219, 283

(56) References Cited

U.S. PATENT DOCUMENTS

| | | | | |
|---|---|---|---|---|
| 4,204,490 A | * | 5/1980 | Ohki et al. ............. | 123/149 A |
| 4,336,778 A | * | 6/1982 | Howard .................. | 123/198 D |
| 4,390,759 A | * | 6/1983 | Scieur ..................... | 200/52 A |
| 4,583,613 A | * | 4/1986 | Nakayama ............ | 123/198 DC |
| 4,664,080 A | * | 5/1987 | Minks .................. | 123/198 DC |
| 4,672,941 A | * | 6/1987 | Yamagata ............... | 123/179.5 |
| 4,735,276 A | * | 4/1988 | Burton ..................... | 180/219 |
| 5,086,866 A | * | 2/1992 | Banjo et al. ............. | 180/219 |
| 5,825,098 A | * | 10/1998 | Darby et al. ............ | 307/10.1 |
| 5,839,536 A | * | 11/1998 | Smith ..................... | 104/111 |
| 6,039,137 A | * | 3/2000 | Schless .................. | 180/220 |
| 6,268,794 B1 | * | 7/2001 | Tzanev .................... | 340/427 |

FOREIGN PATENT DOCUMENTS

| | | | | |
|---|---|---|---|---|
| DE | 29803771 U1 | * | 5/1998 | ............. F02P/1/00 |

OTHER PUBLICATIONS

Derwent–Acc–No: 1998–288280; Electronic Speed Limiter for Motorcycle, English translation of DE29803771U1.*

* cited by examiner

Primary Examiner—Stephen W. Jackson
Assistant Examiner—Sharon Polk
(74) Attorney, Agent, or Firm—Henry W. Cummings

(57) ABSTRACT

In accordance with the present invention, the ignition cutoff assembly includes fork switch 48, ignition coil kill circuit 50, upper bracket support clamps 55, switch activation collar 58, rod 67, upper bracket 73, and lower bracket 76. Fork switch 48 is a commercially available lever-actuated microswitch capable of signaling ignition coil kill circuit 50 upon actuation by switch activation collar 58. Ignition coil kill circuit 50 comprises commercially available electronic circuitry including at least one high voltage transistor 40a and/or 40b or 41a and/or 41b and/or 41c and/or 41d. Upper bracket support clamps 55 are commercially available clamps made of metal, plastic, or other suitable material capable of retaining upper bracket 73. Upper bracket 73 is custom made of metal, plastic, or other suitable material capable of providing a mounting location for fork switch 48. Lower bracket 76 is made of metal, plastic, or other suitable material capable of providing a mounting location for rod 67. Rod 67 is made of metal, plastic, or other suitable material capable of actuating fork switch 48 upon predetermined travel of fork upper section 61 and fork lower section 64. Switch activation collar 58 is made of metal, plastic, or other suitable material capable of adjustment on rod 67 to actuate fork switch 48 upon motion of rod 67.

34 Claims, 6 Drawing Sheets

MOTORCYCLE SAFETY SWITCH

FIELD OF THE INVENTION

This invention relates to vehicle engine rotation particularly motorcycle limiting and ignition disabling devices.

BACKGROUND OF THE INVENTION

During a race or other high-speed activities, various forces act upon a vehicle, tending to lift its front tire(s) off the ground. This creates an unsafe condition because the operator has no control over the vehicle's direction. This also leaves the vehicle vulnerable to outside conditions such as wind. It is therefore desirable to maintain contact between the vehicle's tire(s) and the ground. This invention provides a simple electronic and mechanical means of momentarily deactivating the vehicle's ignition, allowing it to slow to the point that the front tire(s) do not leave the ground, allowing the operator to stay in control.

U.S. Pat. No. 4,221,278 discloses an automatic kill switch as a safety device to cut off the ignition of a motorcycle if it topples over. This invention employs a mercury switch actuated by the vehicle's unusual attitude to deactivate the ignition circuitry.

U.S. Pat. No. 4,262,641 discloses a combined RPM limiter, electronic tachometer, and shift point indicator. The primary purpose of this invention is to prevent engine damage from high RPM. It employs electronic circuitry to limit engine speed to a preset RPM value. In addition, it includes a tachometer to display engine RPM and an indicator to tell the operator when to shift gears.

U.S. Pat. No. 5,368,123 discloses an automotive imbalance safety cut-off system. The primary purpose of this invention is to increase vehicle safety following an accident. Using mechanical and electronic means, this invention detects an imbalanced condition of the vehicle and cuts off fuel to the engine, minimizing the danger of fire or explosion.

U.S. Pat. No. 3,563,219 discloses a maximum engine speed limiter. The primary purpose of this invention is to prevent engine damage due to overspeed. Using complicated electronic circuitry, this invention senses a predetermined engine overspeed condition and limits the voltage to the ignition coil, causing the engine speed to slow below the predetermined level.

U.S. Pat. No. 2,192,262 discloses an emergency cut-out for automotive ignition circuits. The primary purpose of this invention is to minimize the risk of fire caused by ignition sparks igniting spilled fuel in the event the vehicle is involved in an accident causing the vehicle to be upset or turned over onto its side. This invention uses a chamber containing a conducting liquid. During normal conditions, the conducting liquid is kept away from two contacts in an adjacent chamber. In the event of a vehicle upset, the liquid runs into the adjacent chamber, immersing the contacts and killing the vehicle's ignition circuit.

U.S. Pat. No. 2,503,449 discloses an automobile switch structure. The primary purpose of this invention is to minimize the risk of fire caused by ignition sparks igniting spilled fuel in the event the vehicle is involved in an accident causing the vehicle to be upset or turned over onto its side. This invention uses a mercury switch to maintain the functions of the ignition system during normal operation. If the vehicle turns onto its side, the mercury switch removes electrical power from the ignition circuitry.

U.S. Pat. No. 3,034,097 discloses an ignition switch. The primary purpose of this invention is to deactivate the ignition system of a vehicle in the event it assumes a predetermined position or tilt away from the horizontal. This invention employs a closed chamber housing either a conductive liquid or conductive solid. Tilting the vehicle will upset the conductive material. It is optional whether the conductive material maintains the ignition system during normal operation (normally closed), or kills the ignition system after an upset (normally open).

U.S. Pat. No. 3,116,806 discloses a tractor cutoff switch. The primary purpose of this invention is to provide a cutoff switch to prevent damage to or by a self-operating tractor. That is, a tractor that is not operated by a person, but is allowed to perform its job unattended. This invention comprises a long axle with an outrigger type wheel operating to the side of the tractor. This axle is physically connected to the cutoff switch. In the event the tractor deviates from its path and tilts from the horizontal, the angle between the tractor and outrigger axle changes, opening the cutoff switch and removing power from the ignition system. In addition, manual means are provided to override this cutoff switch.

U.S. Pat. No. 3,153,746 discloses an internal combustion engine overspeed control. The primary purpose of this invention is to prevent engine damage due to overspeed. Using complicated electronic circuitry, this invention senses a predetermined engine overspeed condition and limits the voltage to the ignition coil, causing the engine speed to slow below the predetermined level.

U.S. Pat. No. 3,356,082 discloses a spark ignition circuit. The primary purpose of this invention is to prevent the engine speed from exceeding an adjustable value. This invention uses a magnetic pickup arrangement to provide engine speed information to an electronic circuit, which interrupts electrical power to the ignition system when the engine exceeds its preset RPM.

U.S. Pat. No. 3,430,615 discloses an electronic speed control device for an engine. The primary purpose of this invention is to prevent engine damage due to overspeed. Using relatively complicated electronic circuitry, this invention senses a predetermined engine overspeed condition by counting electronic pulses from the ignition system. The invention then limits the voltage to the ignition coil, causing the engine speed to slow below the predetermined level.

U.S. Pat. No. 3,436,637 discloses an overspeed shutdown system for centrifuge apparatus. The primary purpose of this invention is to limit the rotational speed of a centrifuge or other like device with a system not susceptible to mechanical wear or operator misuse. This invention uses electronic means to measure the rotational speed of a centrifuge or like device, translating the speed into an electronic signal. The resulting signal is electronically compared with a reference signal, which interrupts power to the centrifuge when an overspeed condition is detected. In addition, this invention contains a provision for removing power from the centrifuge if the detection circuitry fails.

U.S. Pat. No. 3,599,745 discloses a gravity safety switch. The primary purpose of this invention is to interrupt a circuit if the position of the apparatus to which it is attached should deviate from the horizontal. The invention can be used in but not limited to tractors. This invention uses either a conductive liquid (such as mercury) or a conductive solid (such as a steel ball) to maintain a connection between two contact points. When the device tilts, the conductive material is removed from one or more contacts, breaking an electrical circuit. In an alternative form, the conductive member is supported like a pendulum, which swings away from the contact points when the device is tilted. The pendulum is then held in its displaced position by a magnet, requiring manual resetting.

U.S. Pat. No. 3,743,802 discloses an elongate housing having outstanding protrusions for tiltable conductive fluid type ignition safety switches. The primary purpose of this invention is to minimize damage and/or personal injury if a vehicle should tilt away from the horizontal. This invention uses a container partially full of a conductive fluid (such as mercury). This conductive fluid maintains contact with two electrodes in the container, closing the circuit. Should the vehicle deviate from the horizontal, the liquid is removed from one or both contacts, removing electrical power from the ignition system.

U.S. Pat. No. 3,787,647 discloses a conducting fluid type gravity safety switch with spiral contacts. The primary purpose of this invention is to minimize damage and/or personal injury if a vehicle or other machine to which it is attached should tilt away from the horizontal. This invention uses a container partially full of a conductive fluid (such as mercury). This conductive fluid is out of contact with two electrodes in the container, keeping the circuit open. Should the vehicle deviate from the horizontal, the liquid moves to cover both contacts, grounding the ignition system and causing it to stop. This invention could also be connected to a fuel system to shut off the fuel instead of the ignition in the event of a mishap.

U.S. Pat. No. 4,195,897 discloses a collision activated, automatic electricity disconnector for vehicles. The primary purpose of this invention is to cut off electrical power from a vehicle in the event of a collision or other violent deceleration. This is intended to minimize vehicle fires from spilled fuel being ignited by electrical sparks. This invention uses completely mechanical means to remove the power. This invention comprises a weighted conductor in a base, said base being solidly mounted on the vehicle in question. During normal operation, the weighted conductor remains in place between two contacts in the base. The battery circuit for the vehicle passes through the weighted conductor via the two contacts. If a collision or other violent deceleration occurs, the weighted conductor continues moving forward, removing itself from the base, opening the circuit and removing electrical power from the rest of the vehicle.

SUMMARY OF THE INVENTION

A. OBJECTS OF THE INVENTION

One object of the present invention is to provide a means to temporarily deactivate the firing of a vehicle's ignition circuit to limit engine RPM and prevent the front tire(s) from leaving the ground.

Another object of the present invention is to allow the vehicle operator to achieve the highest possible speed in a race or other activity while keeping the vehicle's front tire(s) on the ground, maintaining safe operation of the vehicle.

B. SUMMARY

In accordance with the present invention, the ignition cutoff assembly includes fork switch 48, ignition coil kill circuit 50, upper bracket support clamps 55, switch activation collar 58, rod 67, upper bracket 73, and lower bracket 76. Fork switch 48 is a commercially available lever-actuated microswitch capable of grounding ignition coil kill circuit 50 upon actuation by switch activation collar 58. Ignition coil kill circuit 50 comprises commercially available electronic circuitry including at least one general purpose transistor 32a and /or 32b, Upper bracket support clamps 55 are commercially available clamps made of metal, plastic, or other suitable material capable of retaining upper bracket 73. Upper bracket 73 is custom made of metal, plastic, or other suitable material capable of providing a mounting location for fork switch 48. Lower bracket 76 is made of metal, plastic, or other suitable material capable of providing a mounting location for rod 67. Rod 67 is made of metal, plastic, or other suitable material capable of actuating fork switch 48 upon predetermined travel of fork upper section 61 and fork lower section 64. Switch activation collar 58 is made of metal, plastic, or other suitable material capable of adjustment on rod 67 to actuate fork switch 48 upon motion of rod 67.

THE DRAWINGS

FIG. 1 is a side view of a rear wheel drive vehicle showing the forces acting on the vehicle at rest when power is applied to the rear axle.

FIG. 2 a side view of a rear wheel drive vehicle showing the forces acting on the vehicle as it gains velocity.

DESCRIPTION OF PREFERRED EMBODIMENTS

Figure 1:
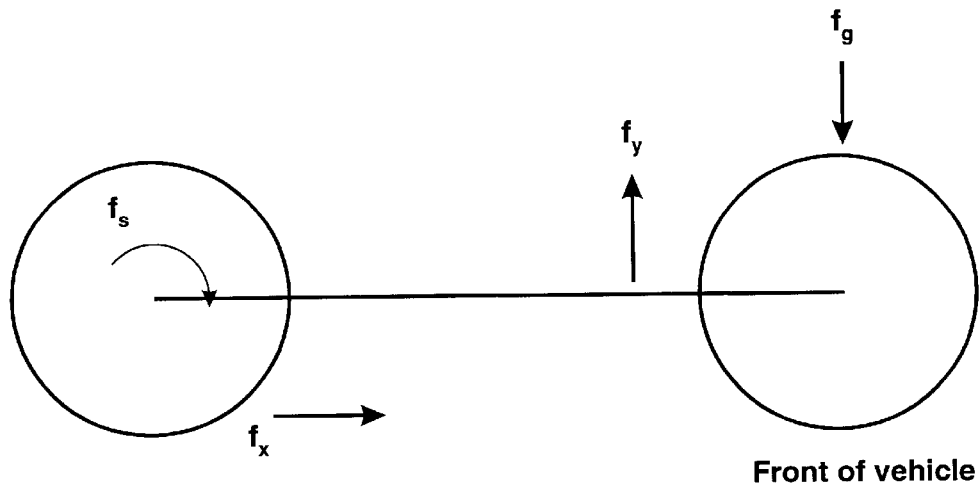

In accordance with the present invention, the ignition cutoff includes fork switch 48, ignition coil kill circuit 50, upper bracket support clamps 55, switch activation collar 58, rod 67, upper bracket 73, and lower bracket 76.

Fork switch 48 is a commercially available lever-actuated microswitch capable of grounding ignition coil kill circuit 50 upon actuation by switch activation collar 58.

Ignition coil kill circuit 50 comprises commercially available electronic circuitry: 2.2 K Ohm ¼ Watt 5% resistor 28, PN2222 NPN general purpose transistors 32a and 32b, 360 Ohm 1 Watt 5% resistors 36a and 36b, 2N4240 high voltage NPN transistors 40a and 40b, and 20 Ohm 10 Watt 10% resistors 44a and 44b.

Upper bracket support clamps 55 are commercially available clamps made of metal, plastic, or other suitable material capable of retaining upper bracket 73. Upper bracket 73 is custom made of metal, plastic, or other suitable material capable of providing a mounting location for fork switch 48.

Lower bracket 76 is made of metal, plastic, or other suitable material capable of providing a mounting location for rod 67.

Rod 67 is made of metal, plastic, or other suitable material capable of actuating fork switch 48 upon predetermined travel of fork upper section 61 and fork lower section 64.

Switch activation collar 58 is made of metal, plastic, or other suitable material capable of adjustment on rod 67 to actuate fork switch 48 upon motion of rod 67.

FIG. 1 shows a side view of the forces acting upon a rear-wheel drive vehicle at rest when power is applied at the rear axle. The forces are defined as follows:

$F_s$—the rotational force applied at the rear wheel or wheels, and translates to the vehicle into 3 forces:

$F_x$—the force of the rear tire(s) on the road surface resulting in forward acceleration. $F_y$—the torque at the rear axle acting on the frame of the vehicle resulting in an upward force at the front of the vehicle.

$F_1$ (not shown)—the loss due to flex throughout the driveline and frame of the vehicle.

$F_g$—the force of gravity opposing $F_y$ at the front of the vehicle.

When the resultant $F_y$ exceeds $F_g$ as a result of too much power, the front of the vehicle leaves the ground, creating an unstable driving condition.

Figure 2:
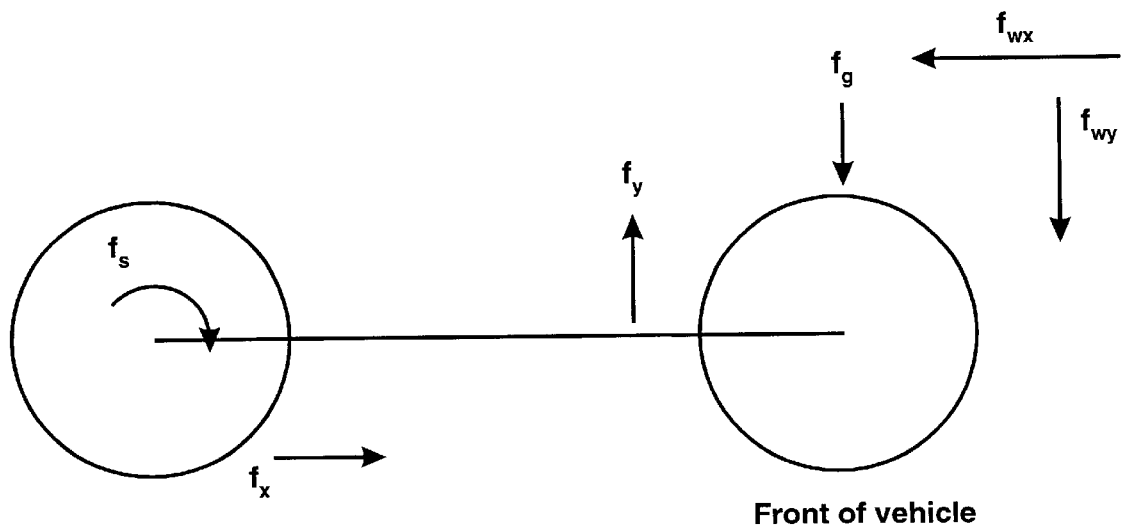

FIG. 2 shows the additional forces on the vehicle as it gains velocity. $F_{wx}$ and $F_{wy}$ result from wind drag on the vehicle. These two forces react against $F_x$ and $F_y$ with increasing magnitude proportional to velocity. As a result, the greater the velocity, the greater the force that may be applied at the rear axle. Therefore, as velocity increases the likelihood of the front of the vehicle leaving the ground decreases.

Figure 3:
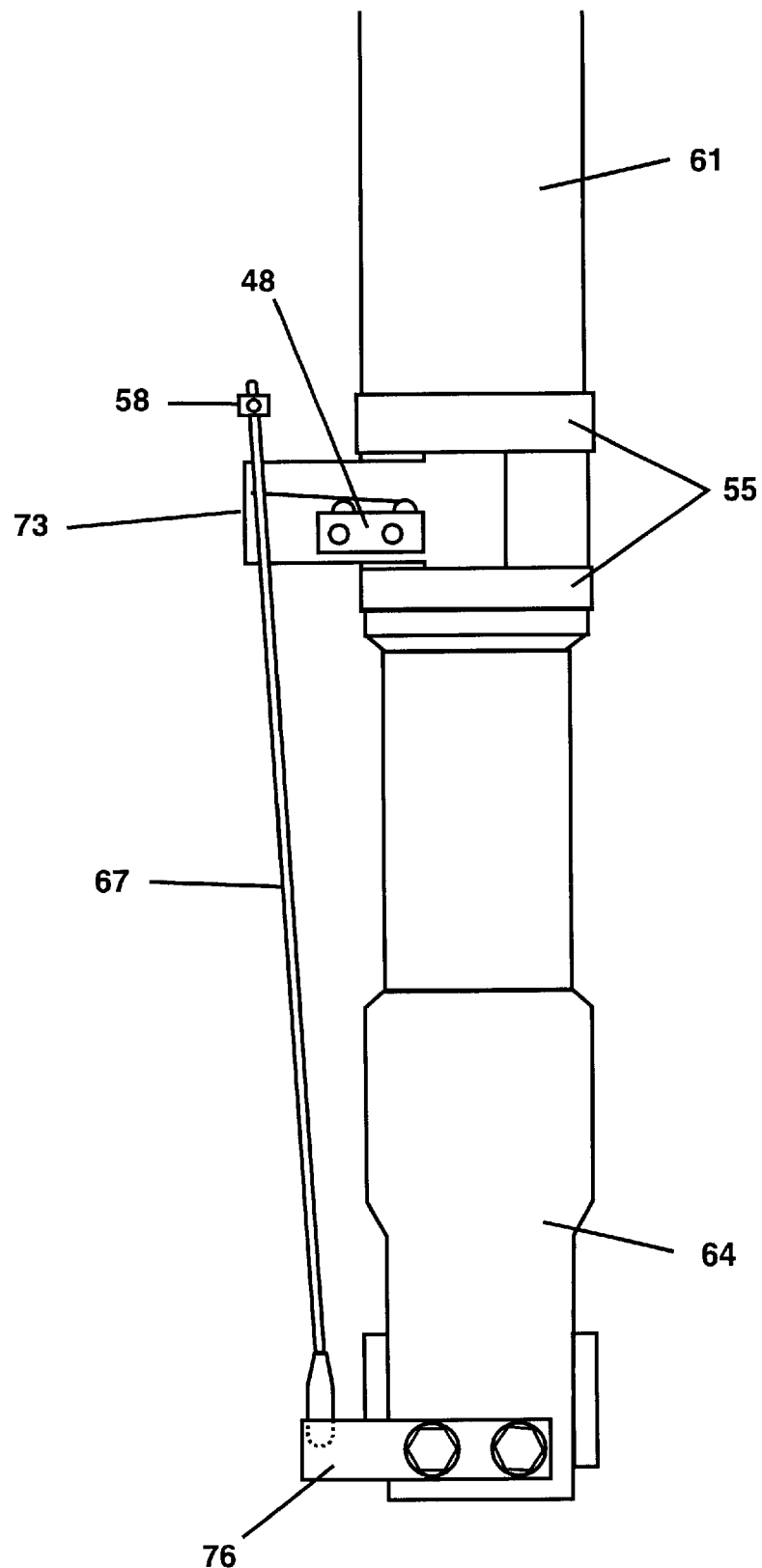
FIG. 3 is a view of one of a pair of motorcycle front forks.

FIG. 3 shows one-half of a set of common motorcycle forks. Fork upper section 61 and fork lower section 64 move together or apart from one another as a result of the weight applied to fork upper section 61.

As previously explained, this weight decreases in proportion to vehicle velocity. Lower bracket 76 is mounted to fork lower section 64 and provides a secure mounting for the lower section of rod 67. Upper bracket 73 is securely mounted to fork upper section 61 by means of upper bracket support clamps 55. Rod 67 is fixed in motion relative to fork lower section 64, so it is free to move up and down relative to upper bracket 73. Switch activation collar 58 is adjustable on rod 67, to allow fork switch 48 to be activated at full extension of the forks (representing a zero weight condition).

When fork upper section 61 and fork lower section 64 reach the end of the preadjusted travel, switch activation collar 58 presses down on the lever of fork switch 48. This closes switch 48, providing a ground to ignition coil kill circuit 50.

Figure 4:
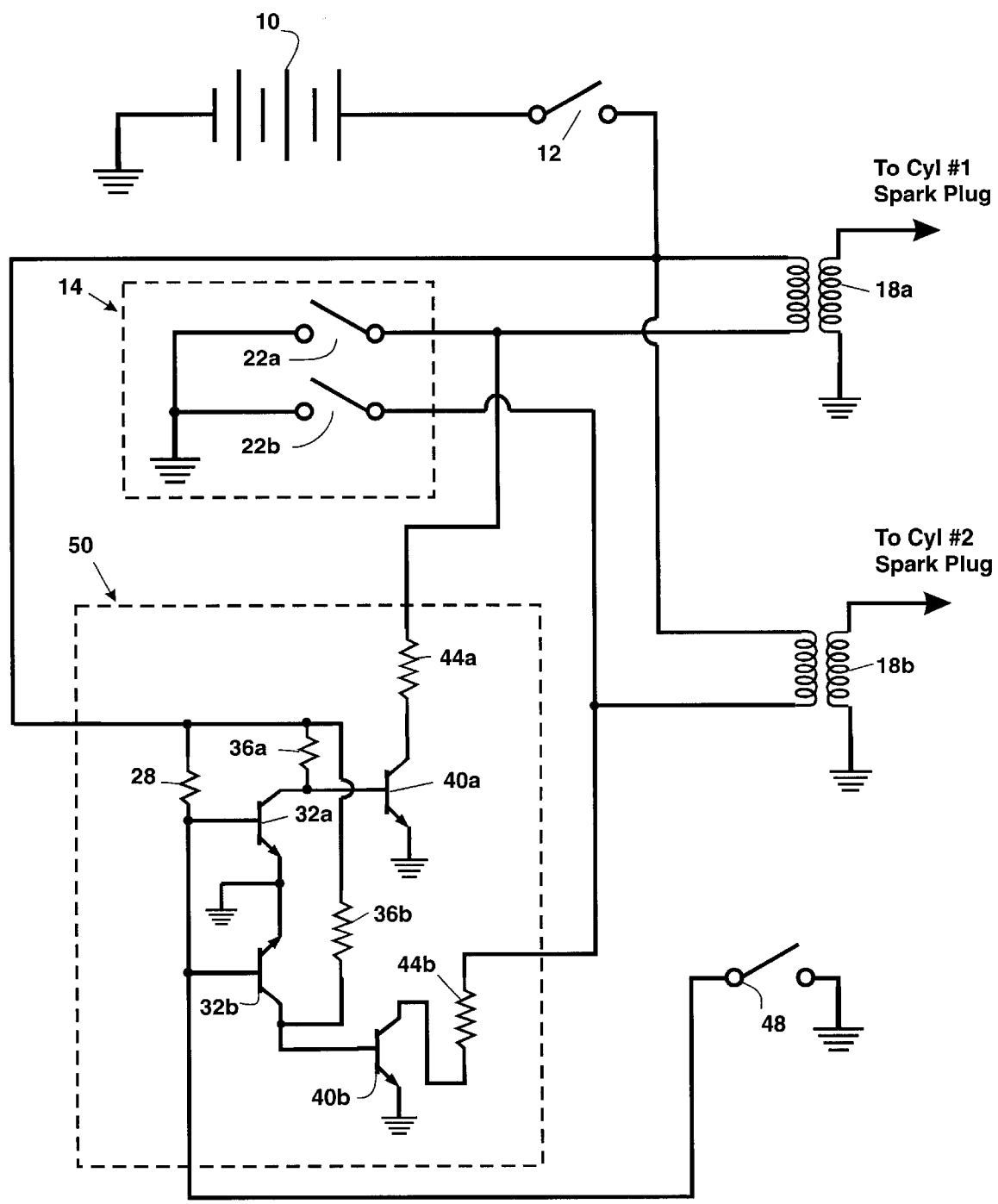
FIG. 4 is a schematic diagram of an electronic circuit for a 2-cylinder, dual coil motorcycle application.

FIG. 4 is a schematic diagram showing ignition coil kill circuit 50, fork switch 48, and various components common to the vehicle. The typical ignition circuit of the motorcycle in this application is comprised of battery 10, ignition switch 12, ignition module (or breaker points) 14, cylinder #1 ignition coil 18a, cylinder #2 ignition coil 18b, and spark plugs (not shown).

The ignition circuit works as follows: Ignition module 14 uses a cam and crankshaft position sensor and other inputs to determine the duration and timing at which to fire coils 18a and 18b. Through the switching circuits represented as switches 22a and 22b, the ignition module grounds each coil at a calculated time for a period of time to allow it to charge. This creates a magnetic field in the core. At the calculated time the grounded circuit is opened. As the magnetic field in the coil decays, it creates a current through the secondary winding of the coil which causes an arc across the contacts of the spark plug.

The vehicle's ignition circuit is not normally affected by kill circuit 50. When fork switch 48 is open, voltage from battery 10 flows through 2.2 K Ohm resistor 28, saturating PN2222 transistors 32a and 32b. This shorts the bases of 2N4240 high voltage transistors 40a and 40b to ground, leaving their collectors open which allows operation of coils 18a and 18b. When the forks are fully extended, switch 48 closes, applying a ground to PN2222 transistors 32a and 32b. No longer saturated to ground, the collectors open allowing current flow through 360 Ohm resistors 36a and 36b. This saturates 2N4240 high voltage transistors 40a and 40b, shorting their collectors to ground.

The short to ground through 20 Ohm resistors 44a and 44b prevents coils 18a and 18b from completely discharging, preventing the coils from generating enough voltage to cause a spark across the spark plug contacts.

Figure 5:
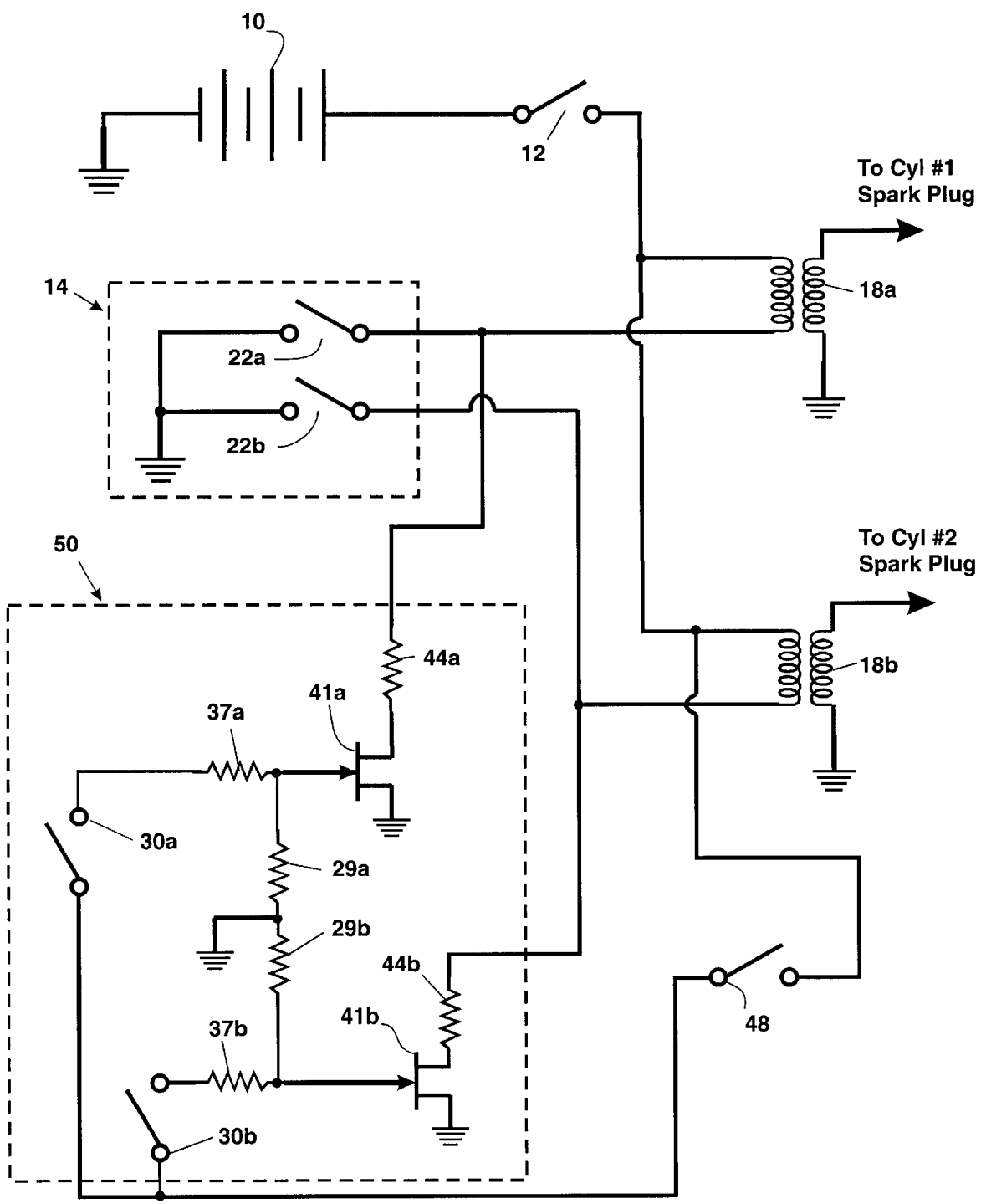
FIG. 5 is a schematic diagram of an alternate version of an electronic circuit for a 2-cylinder, dual coil motorcycle application.

FIG. 5 is a schematic diagram showing another version of coil kill circuit 50. Fork switch 48 in this circuit now switches battery voltage into the coil kill circuit. When the motorcycle's forks are fully extended, switch 48 closes, applying battery voltage through 10 K ohm resistors 37a and 37b which pulls the voltage up at the gates of the high voltage field effect transistors (FET) (IRF840) 41a and 41b. This in turn switches the FETs on, shorting the source pins to the grounded drain pins.

The short to ground through 20 ohm resistors 44a and 44b prevents coils 18a and 18b from completely discharging, preventing the coils from generating enough voltage to cause a spark across the spark plug contacts. Either switch 30a or 30b may be opened selectively by the vehicle operator to decrease the effect of the coil kill for better performance with less of a safety factor. Both switches may be turned off to disable the system.

The typical ignition circuit of the motorcycle in this application is comprised of battery 10, ignition switch 12, ignition module (or breaker points) 14, cylinder #1 ignition coil 18a, cylinder #2 ignition coil 18b, and spark plugs (not shown).

The ignition circuit works as follows: Ignition module 14 uses a cam and crankshaft position sensor and other inputs to determine the duration and timing at which to fire coils 18a and 18b. Through the switching circuits represented as switches 22a and 22b, the ignition module grounds each coil at a calculated time for a period of time to allow it to charge. This creates a magnetic field in the core. At the calculated time the grounded circuit is opened. As the magnetic field in the coil decays, it creates a current through the secondary winding of the coil which causes an arc across the contacts of the spark plug.

The vehicle's ignition circuit is not normally affected by kill circuit 50. When fork switch 48 is open, no voltage flows through the 10 K ohm resistors 37a and 37b, leaving the gates of FETs 41a and 41b at 0 volts through the 10 K ohm resistors 29a and 29b. This keeps FETs 41a and 41b turned off leaving their sources open, which allows operation of the coils.

When the forks fully extend, switch 48 closes to battery voltage, which applies voltage on the gates of FETs 41a and 41b, provided that switches 30a and 30b are closed. This turns FETs 41a and 41b on, shorting their sources to ground at the drains. The short to ground through 20 ohm resistors 44a and 44b prevents the coils from discharging completely, which in turn prevents the magnetic field from changing enough to generate sufficient voltage through the secondary windings of the coils to cause a spark across the spark plug contacts. Switch 30a or 30b may be opened to disable only one of the two coils. Both may be opened to disable the system.

Figure 6:
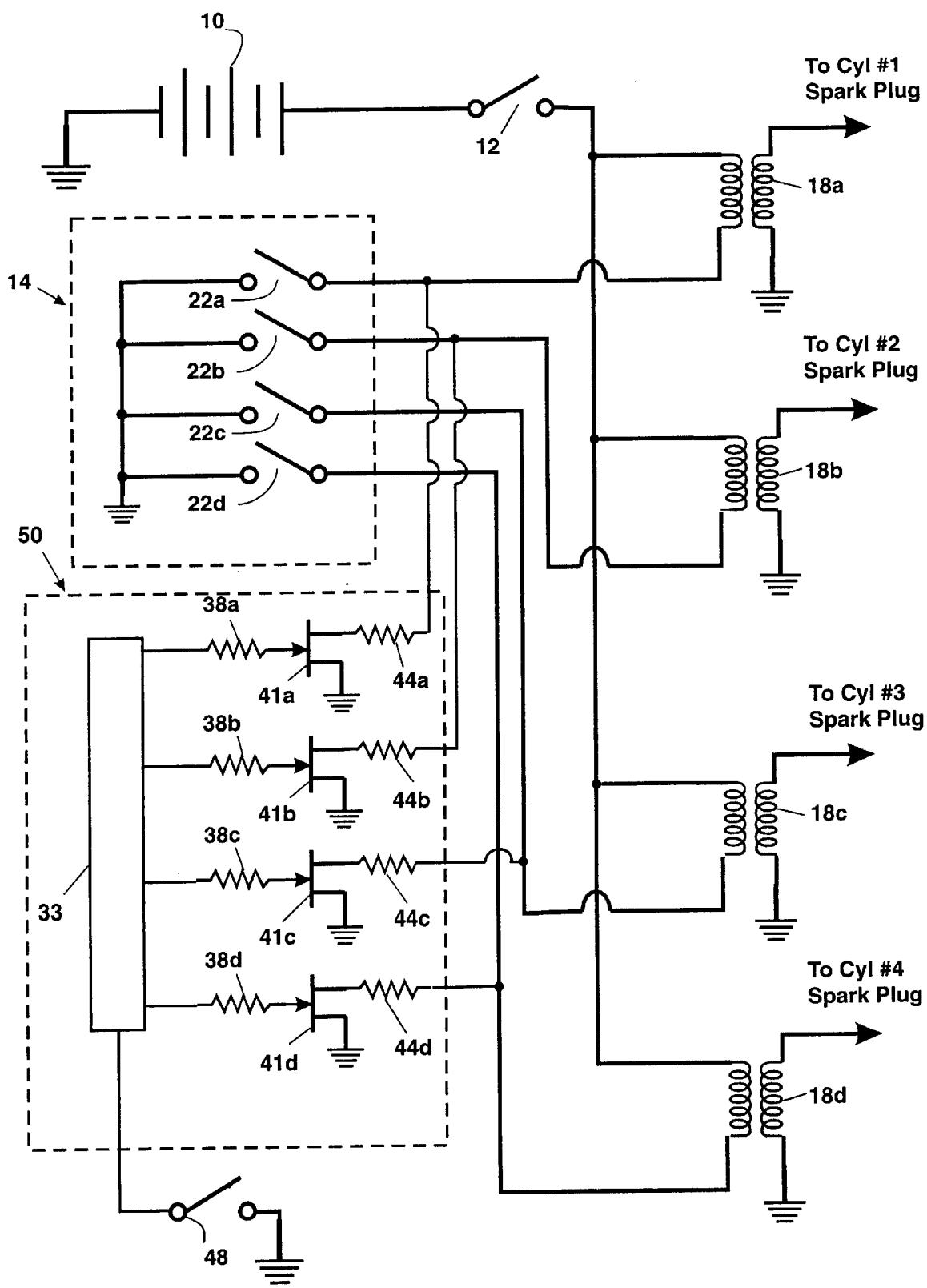
FIG. 6 is a schematic diagram of an electronic circuit for a 4-cylinder, four-coil motorcycle application.
Figure 7:
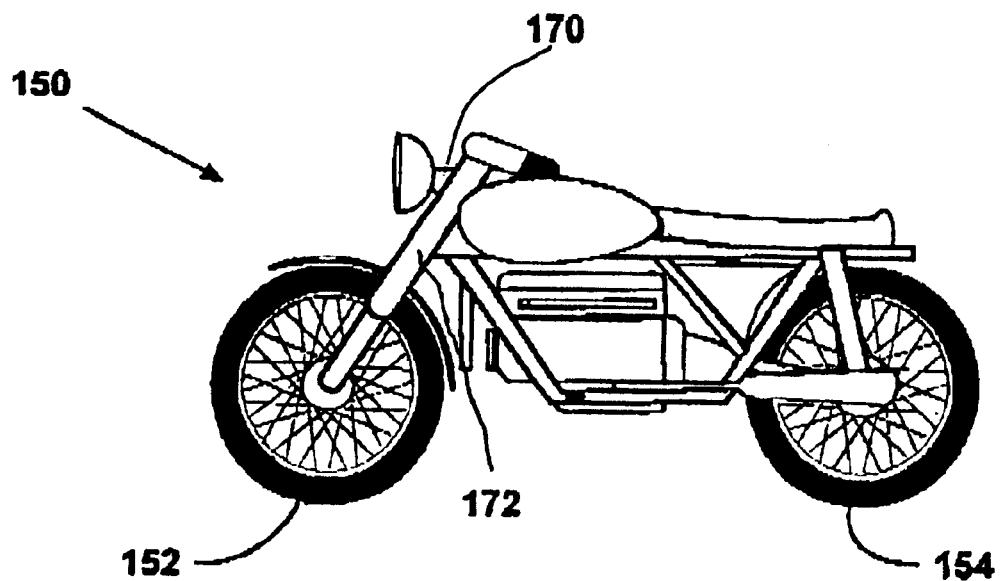
Figure 8:
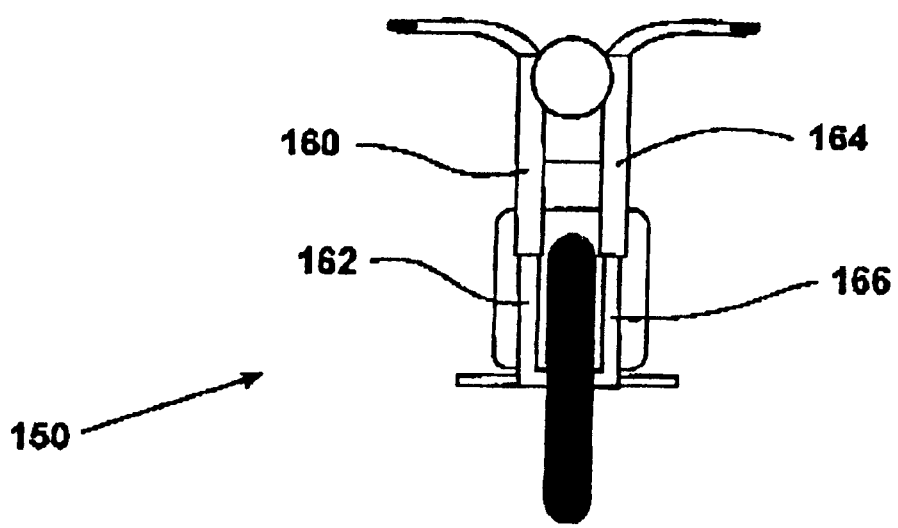

FIG. 6 is a schematic diagram showing another version of coil kill circuit 50. This diagram uses the example of a 4 cylinder motorcycle with 4 separate ignition coils 18a, 18b, 18c, and 18d. In this circuit, fork switch 48 switches ground to the coil kill circuit 50 to signal the need for a coil kill. Coil kill circuit 50 utilizes micro-controller 33 to programmably kill individual coils selected by the user.

The micro-controller may be programmed to accept DIP-switch (not shown) inputs from the user to set time delays for one-shot type disabling, select particular cylinders to kill under certain conditions, or disable the system.

FIG. 6 shows the electronic circuit. It works as follows:

The typical ignition circuit of the motorcycle in this application is comprised of battery 10, ignition switch 12, ignition module 14, cylinders 1 through 4 ignition coils, and spark plugs (not shown). The ignition module, using a cam and crankshaft position sensor and other inputs, determines the duration and timing at which to fire the coils. Through the switching circuits 22a, 22b, 22c, and 22d, the ignition module grounds each coil at a calculated time for a period of time to charge it. This creates a magnetic field in the core. At the calculated time, the ground circuit is opened. As the magnetic field in the coil decays, it creates a current through the secondary winding of the coil, which causes an arc across the contacts of the spark plug.

The vehicle's ignition circuit is normally not affected by the kill circuit. When fork switch 48 is open, micro-controller 33 switches the gates of FETs 41a, 41b, 41c, and 41d off through 4.7 K ohm resistors 38a, 38b, 38c, and 38d. This leaves FETs 41a, 41b, 41c, and 41d sources open which allows operation of the ignition coils.

When the forks fully extend, fork switch 48 closes to battery voltage, which signals micro-controller 33 of the condition. Preset user-accessible DIP switches (not shown) determine to micro-controller 33 a desired program/time to disable each individual ignition coil. This allows for a variable "kill" to maximize performance while maintaining control. Micro-controller 33 can individually apply voltage to the gates of FETs 41a, 41b, 41c, and 41d. The applied voltage turns FETs 41a, 41b, 41c, and 41d on, shorting their sources to ground at their drains. The short to ground through 20 ohm resistors 44a, 44b, 44c, and 44d prevents the coil from discharging completely which in turn prevents the magnetic field from changing enough to generate sufficient voltage through the secondary windings of the coils to cause a spark across the spark plug contacts.

What is claimed is:

1. A two wheeled vehicle having a front wheel and a rear wheel and an ignition cutoff assembly comprising:

a lower rod support [means] adapted to be mounted on said front wheel having a front lower suspension system, said suspension system supporting a generally vertically extending rod;

an upper rod support adapted to be mounted on a vehicle body allowing vertical movement of said rod and limited lateral movement;

said upper rod support also comprising means for supporting a first electrical switch effective to deactivate ignition of at least one cylinder of said vehicle;

said generally vertically extending rod having an upper end portion comprising an electrical contact whereby when said electrical contact contacts said electrical switch, at or near the point when said front wheel leaves the surface upon which it is riding;

ignition in said cylinder is deactivated.

2. A vehicle ignition cutoff assembly according to claim 1 wherein said lower rod support comprises a lower bracket assembly.

3. A vehicle ignition cutoff assembly according to claim 1 wherein said upper rod support comprises an upper bracket assembly.

4. A vehicle ignition cutoff assembly according to claim 1 wherein said switch comprises an electrical circuit in electrical communication with means for causing ignition of said cylinder.

5. A vehicle ignition cutoff assembly according to claim 4 wherein first electrical switch comprises a commercially available lever-actuated microswitch.

6. A vehicle ignition cutoff assembly according to claim 3 wherein said upper bracket assembly includes at least one upper support clamp.

7. A two wheeled vehicle having a front wheel and a rear wheel and an ignition cutoff assembly comprising:

a lower rod support adapted to be mounted on said front wheel having a front lower suspension system;

a lower rod support adapted to be mounted on a motor vehicle having a front lower suspension system, said suspension system supporting a generally vertically extending rod;

an upper rod support adapted to be mounted on a vehicle body allowing vertical movement of said rod and limited lateral movement;

said upper rod support also comprising means for supporting a first electrical switch including at least one transistor effective to deactivate ignition of at least one cylinder of said vehicle;

said generally vertically extending rod having an upper end portion comprising a electrical contact;

whereby when said electrical contact contacts said first electrical switch at or near the point when said front wheel leaves the surface upon which it is riding;

ignition in said cylinder is deactivated.

8. A vehicle ignition cutoff assembly according to claim 3 wherein said upper bracket assembly is selected from metal, plastic and composite material capable of providing a mounting location for said switch means.

9. A vehicle ignition cutoff assembly according to claim 6 wherein said bracket support clamp is made from a material selected from the group consisting of metal, plastic, or composite materials capable of retaining said upper bracket means.

10. A vehicle ignition cutoff assembly according to claim 2 wherein said lower bracket assembly is made from a material selected from the group consisting of metal, plastic, or composite material capable of providing a mounting location for said rod.

11. A vehicle ignition cutoff assembly according to claim 9 wherein said rod is-made from a material selected from the group consisting of metal, plastic, or composite material capable of actuating said first switch means upon predetermined travel of said vehicle body.

12. A vehicle ignition cutoff assembly according to claim 11 wherein a switch activation collar made from a material selected from the group consisting of metal, plastic, or other suitable material capable of adjustment on said rod to actuate said first switch upon motion of said rod.

13. A vehicle ignition cutoff assembly according to claim 7 wherein when said first switch is activated, said circuit provides a ground to deactivate at least one ignition coil in said circuit.

14. A vehicle ignition cutoff assembly according to claim 13 wherein when said first switch deactivates an ignition module circuit including a first cylinder ignition coil and a second cylinder ignition coil.

15. A vehicle ignition cutoff assembly according to claim 14 wherein when said switch is open, current from a voltage source flows through a resistance saturating at least one first transistor which in turn shorts the base of at least one second high voltage transistor to ground, leaving their collectors open, which allows operation of said coils.

16. A vehicle ignition cutoff assembly according to claim 15 wherein when said first switch closes, a ground to is applied to said first transistor, whereby said collector is no longer saturated to ground, said collector opens allowing current flow through said resistor, which in turn saturates said second high voltage transistor, and shorting said collector to ground.

17. A vehicle ignition cutoff assembly according to claim 16 wherein when said first switch closes said short to ground through said resistor prevents said coils from completely discharging, and thus preventing said coils from generating enough voltage to cause a spark across at least one spark plug contact.

18. A vehicle ignition cutoff assembly according to claim 16 wherein when said resistance includes more than one resistance.

19. A vehicle ignition cutoff assembly according to claim 16 wherein when said first transistor includes more than one transistor.

20. A vehicle ignition cutoff assembly according to claim 17 wherein said resistance includes more than one resistance.

21. A vehicle ignition cutoff assembly according to claim 17 wherein when said second transistor includes more than one transistor.

22. A vehicle ignition cutoff assembly according to claim 14 wherein when said first switch is open, current flows to ground at the base of a high voltage transistor means, whereby said collector is left open which allows operation of said ignition coil.

23. A vehicle ignition cutoff assembly according to claim 15 wherein when said first switch closes, voltage source is applied to said first resistor, which in turn saturates said high voltage transistor, and shorting said collector to ground.

24. A vehicle ignition cutoff assembly according to claim 23 wherein said short to ground through said second resistor prevents said coil from completely discharging, and thus preventing said coils from generating enough voltage to cause a spark across at least one spark plug contact.

25. A vehicle ignition cutoff assembly according to claim 23 wherein when said first resistance includes more than one resistance.

26. A vehicle ignition cutoff assembly according to claim 23 wherein said high voltage transistor includes more than one transistor.

27. A vehicle ignition cutoff assembly according to claim 24 wherein said second resistance includes more than one resistance.

28. A vehicle ignition cutoff assembly according to claim 14 wherein when said switch is open, a programmable micro-processor receiving said signal switches the base of a high voltage transistor off, whereby said collector is left open which allows operation of said ignition coil.

29. A vehicle ignition cutoff assembly according to claim 28 wherein when said first switch closes, said programmable micro processor determines, through user selectable switches, a duration to apply voltage to said first resistor, which in turn saturates said high voltage transistor, and shorting said collector to ground.

30. A vehicle ignition cutoff assembly according to claim 29 wherein said short to ground through said second resistor prevents said coil from completely discharging, and thus preventing said coils from generating enough voltage to cause a spark across at least one spark plug contact.

31. A vehicle ignition cutoff assembly according to claim 29 wherein said micro processor applies voltage to more than one first resistor.

32. A vehicle ignition cutoff assembly according to claim 29 wherein said high voltage transistor includes more than one transistor.

33. A vehicle ignition cutoff assembly according to claim 30 wherein said second resistance includes more than one resistance.

34. A two wheeled vehicle having a front wheel and a rear wheel and an ignition cutoff assembly comprising:
- a lower rod support adapted to be mounted on said front wheel having a front lower suspension system;
- a lower rod support adapted to be mounted on a motor vehicle having a front lower suspension system, said suspension system supporting a generally vertically extending rod;
- an upper rod support adapted to be mounted on a vehicle body allowing vertical movement of said rod and limited lateral movement;
- said upper rod support also comprising means for supporting a first electrical switch including at least one micro processor effective to deactivate ignition of at least one cylinder of said vehicle;
- said generally vertically extending rod having an upper end portion comprising an electrical contact;
- whereby when said electrical contact contacts said electrical switch, at or near the point when said front wheel leaves the surface upon which it is riding;
- ignition in said cylinder is deactivated.

* * * * *